United States Patent [19]

Schlanger

[11] 3,837,422

[45] Sept. 24, 1974

[54] SAFETY VEHICLE

[76] Inventor: Samuel L. Schlanger, 2600 N. Flagler Dr., Apt. 907, West Palm Beach, Fla.

[22] Filed: Nov. 13, 1972

[21] Appl. No.: 306,268

[52] U.S. Cl.......... 180/91, 280/150 B, 280/150 AB, 296/35 B
[51] Int. Cl............................................. B62d 39/00
[58] Field of Search.................. 180/82 R, 89 R, 91; 296/35 R, 65 A; 280/150 B, 150 AB

[56] References Cited
UNITED STATES PATENTS

| | | | |
|---|---|---|---|
| 2,025,822 | 12/1935 | Pryor | 280/150 B |
| 2,929,637 | 3/1960 | Papacosta | 180/82 R |
| 2,959,446 | 11/1960 | Thompson | 296/65 A |
| 3,011,823 | 12/1971 | Maher | 280/150 B |
| 3,162,479 | 12/1964 | Hewitt | 180/82 R |
| 3,383,077 | 5/1968 | Noviello, Jr. | 180/82 R |
| 3,508,783 | 4/1970 | Schlanger | 296/35 R |
| 3,605,935 | 9/1971 | Gilbert | 180/89 R |
| 3,664,682 | 5/1972 | Wycech | 280/150 AB |
| 3,687,485 | 8/1972 | Campbell | 280/150 B |
| 3,692,327 | 9/1972 | Barrick | 280/150 B |

FOREIGN PATENTS OR APPLICATIONS

| | | | |
|---|---|---|---|
| 705,020 | 3/1973 | France | 296/35 R |

*Primary Examiner*—Kenneth H. Betts
*Assistant Examiner*—Jack D. Rubenstein
*Attorney, Agent, or Firm*—Allison C. Collard

[57] ABSTRACT

A safety vehicle for passengers, including a vehicle body, a passenger compartment movable on the vehicle body, and pivotable safety nets mounted on the ceiling of the passenger compartment for disposal in front of the passengers in the vehicle in response to the impact of a collision. A pair of elongated, linearly perforated tracks are mounted on the vehicle body, and receive at least one pair of sprocket wheels, rotatably mounted at the rearward end of the passenger compartment. The sprocket wheels engage the perforated tracks and guide the passenger compartment therealong. Guide wheels are rotatably mounted on the front end of the passenger compartment and are disposed in upwardly inclined guide tracks mounted on the vehicle body in front of the passenger compartment. Slidable bumpers engaged during a collision activate a mechanical linkage which releases the passenger compartment so that it is movable on the guide tracks, collapses the steering column of the passenger compartment, and deploying safety nets, inflatable bags, or a combination of both, in front of the passengers of the vehicle to prevent injury to them. The vehicle also includes a safety front passenger seat having a crash barrier which is rigidly affixed to the passenger compartment, and a mechanical linkage for applying the brakes of the vehicle automatically at impact. The movable passenger compartment maintains the momentum of the passengers riding therein until obstructions in the passenger compartment have been removed and safety restraining devices have been activated.

21 Claims, 30 Drawing Figures

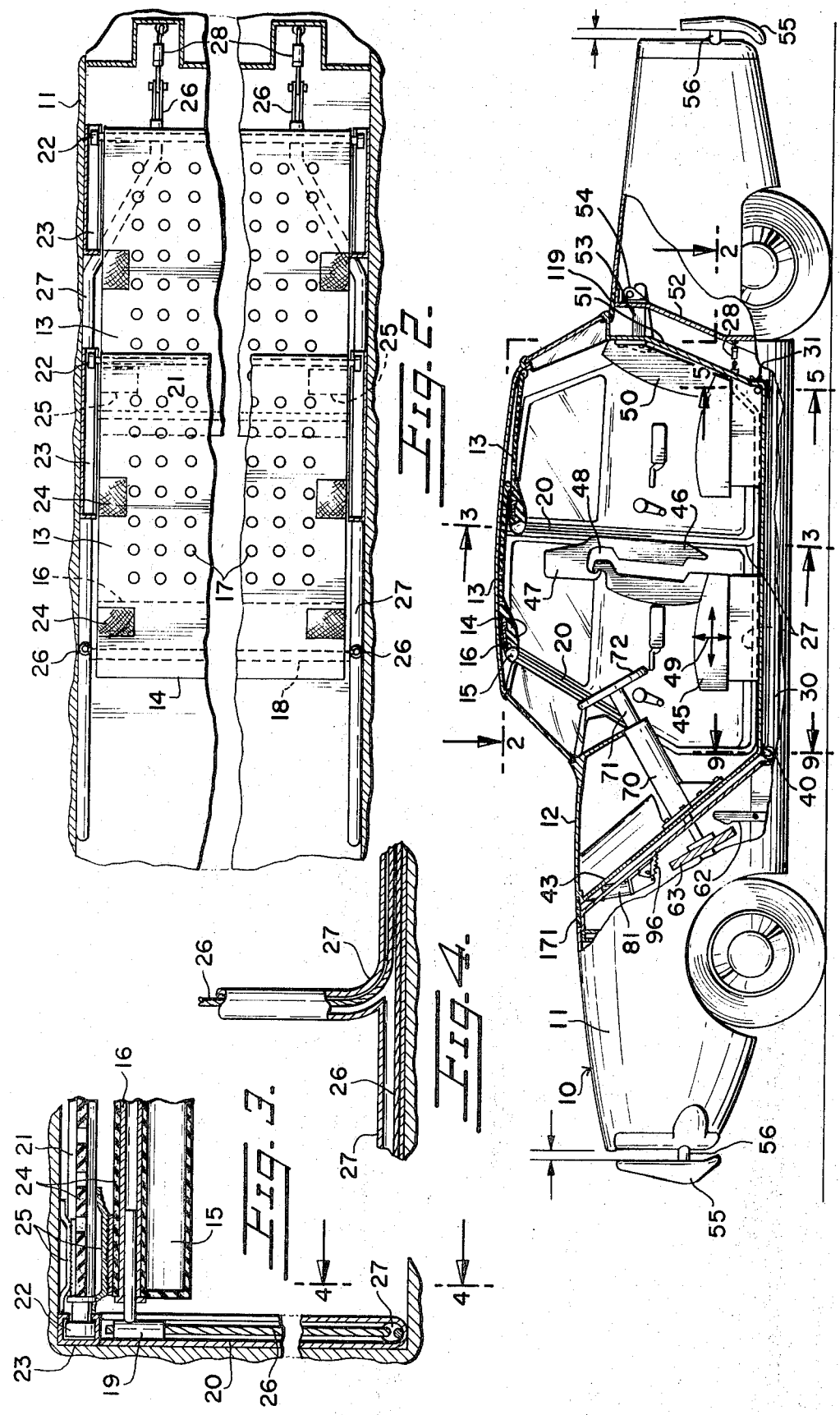

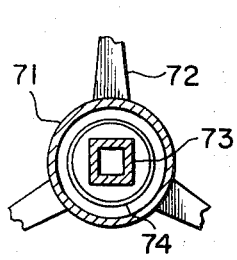
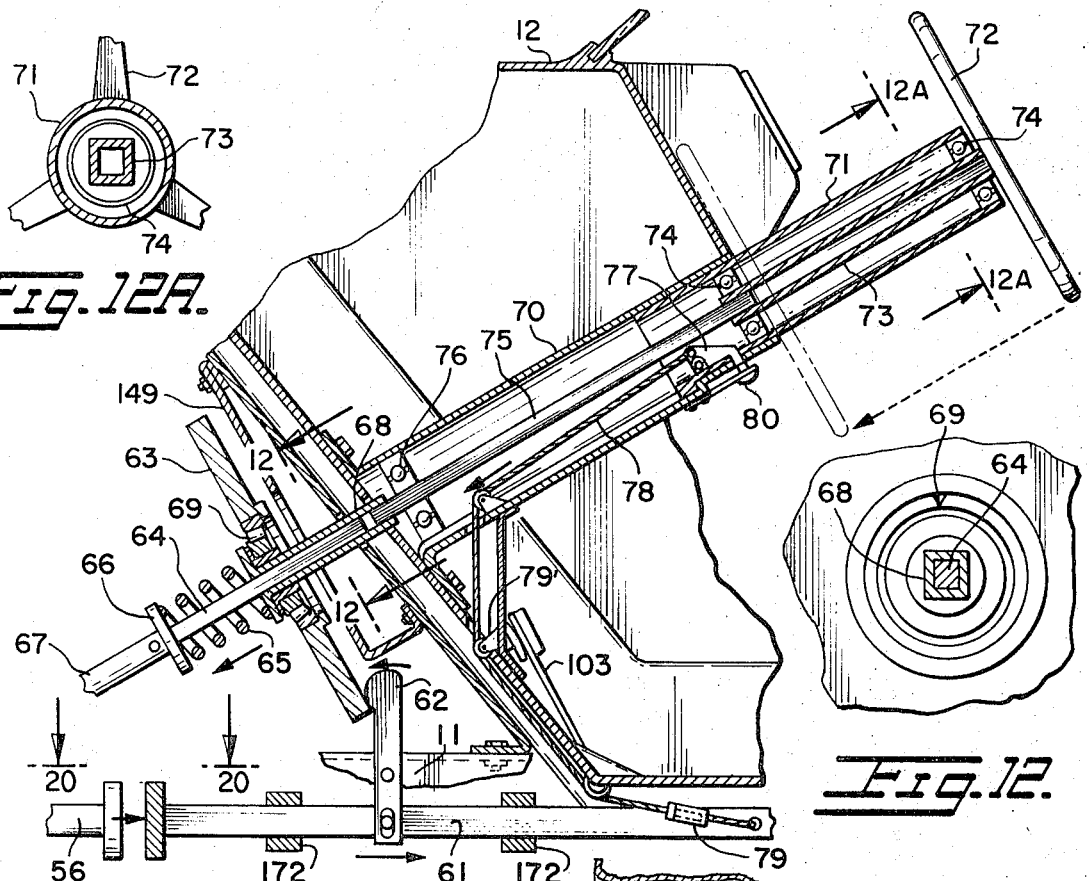
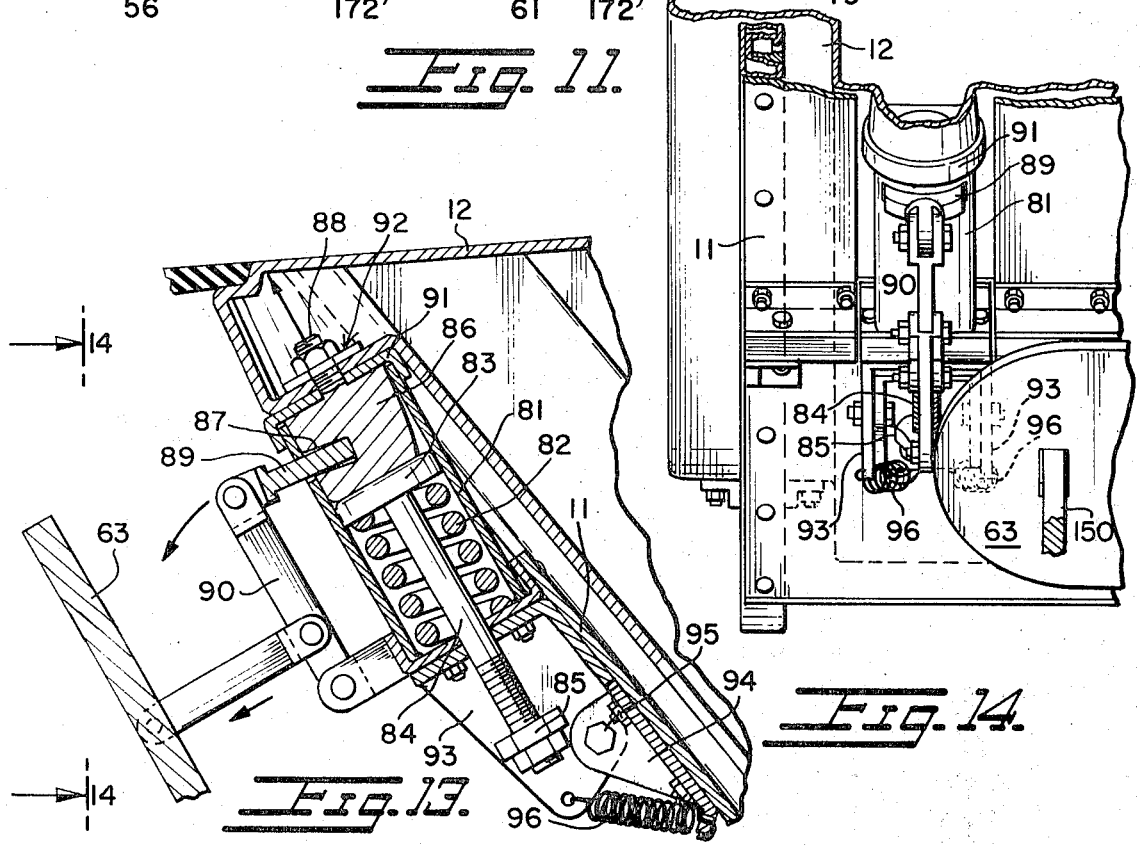

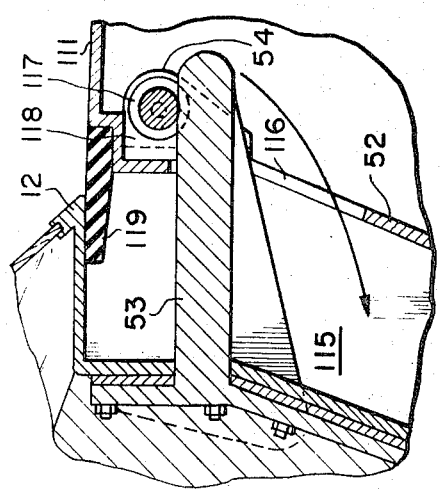
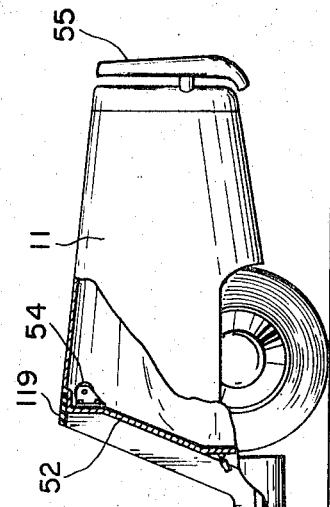
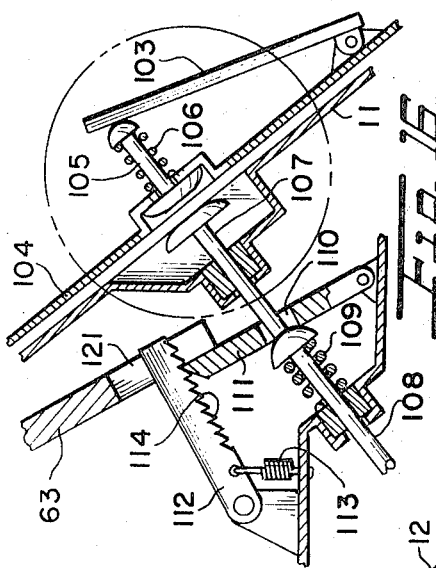
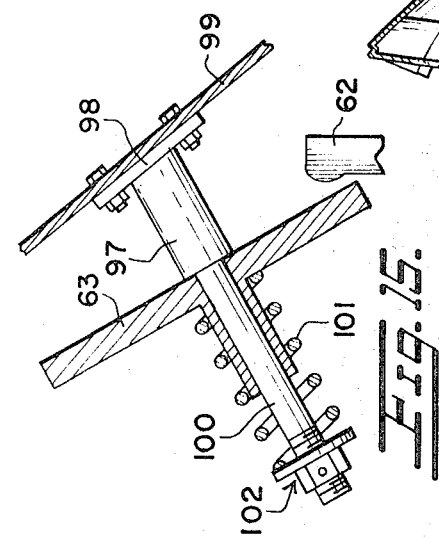
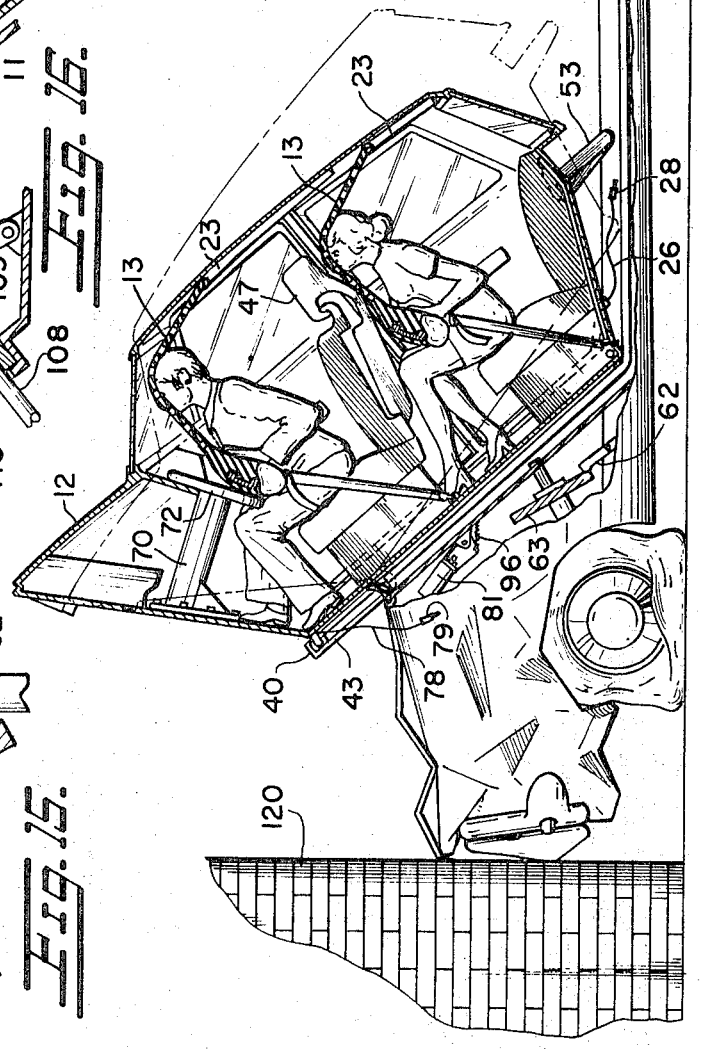

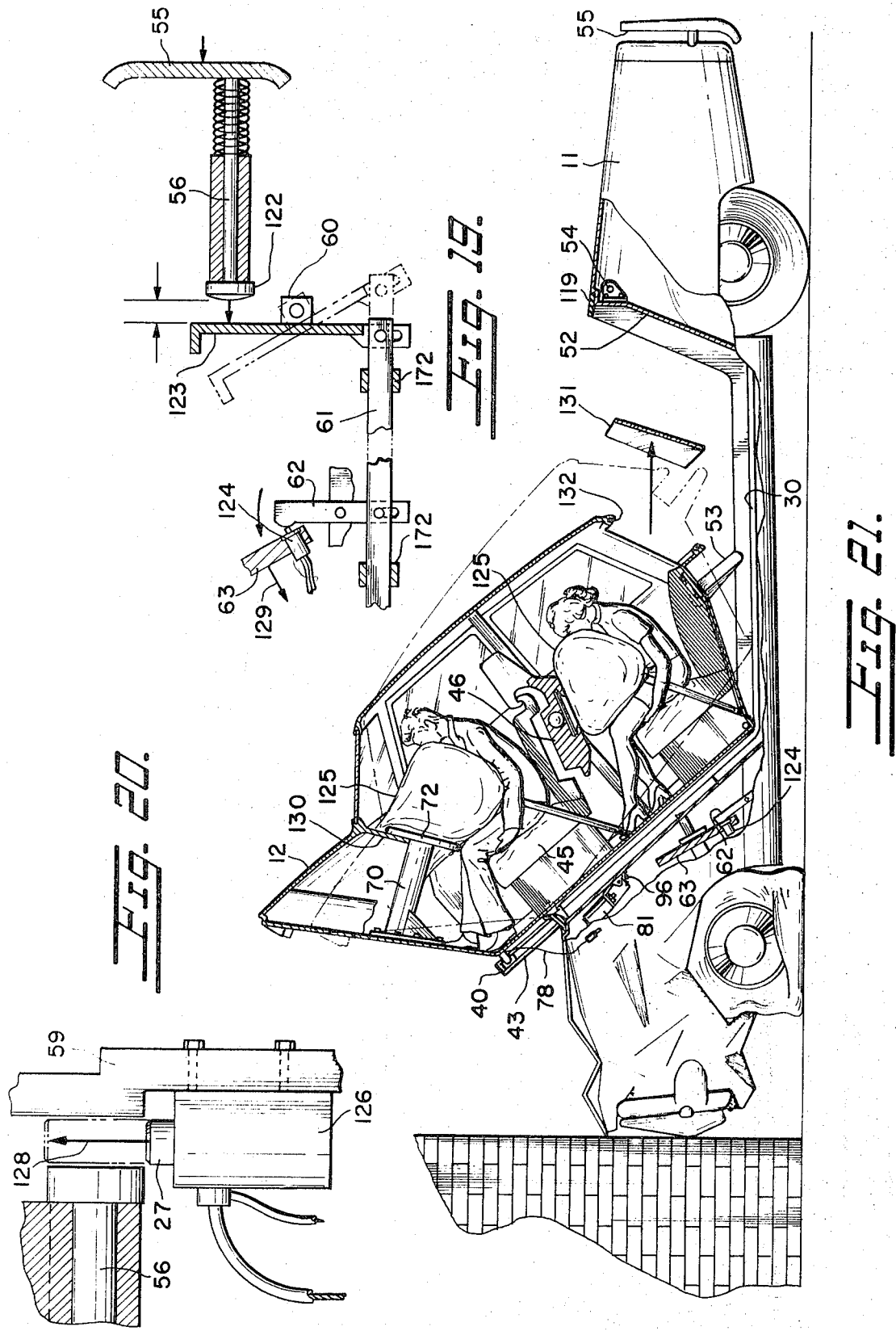

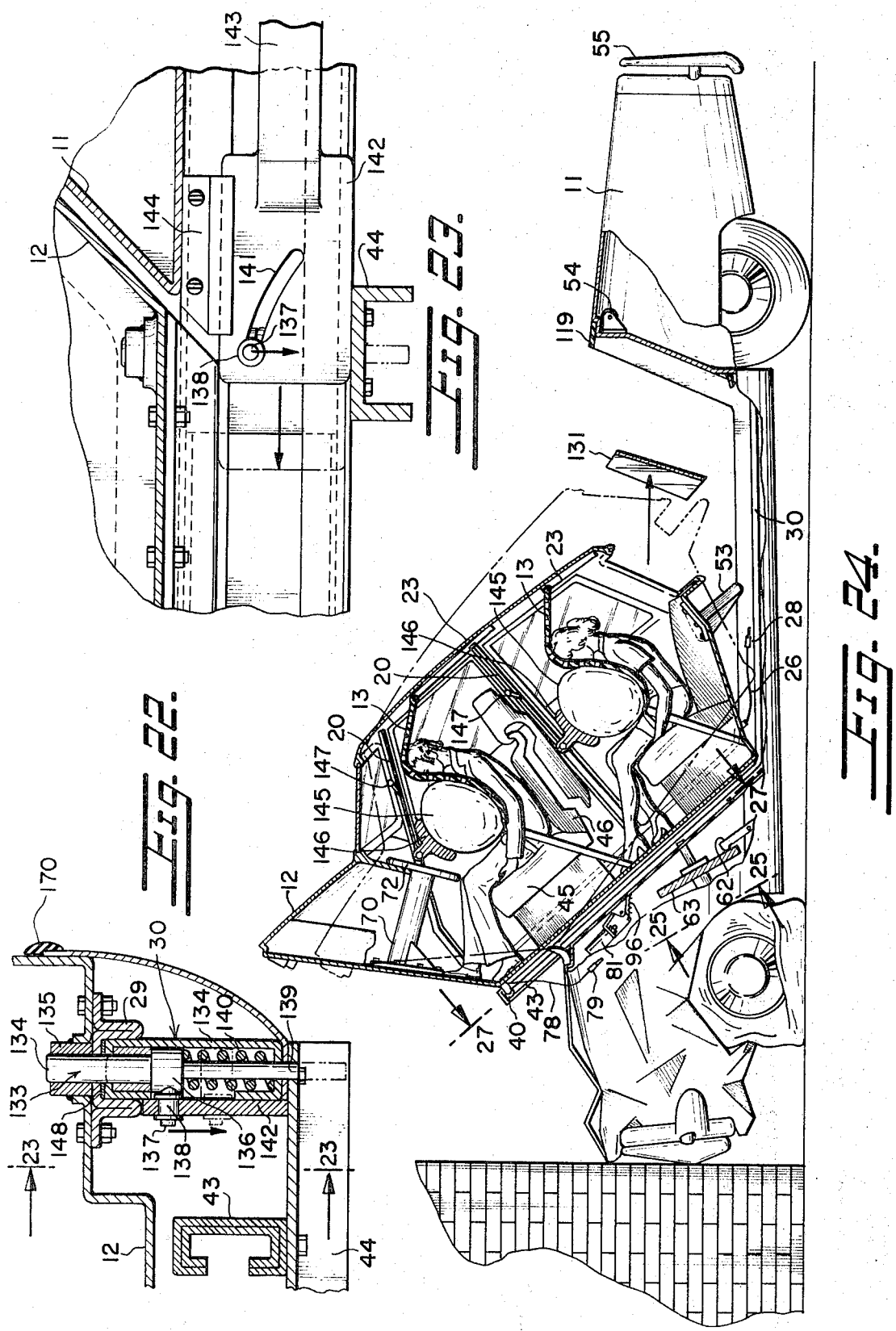

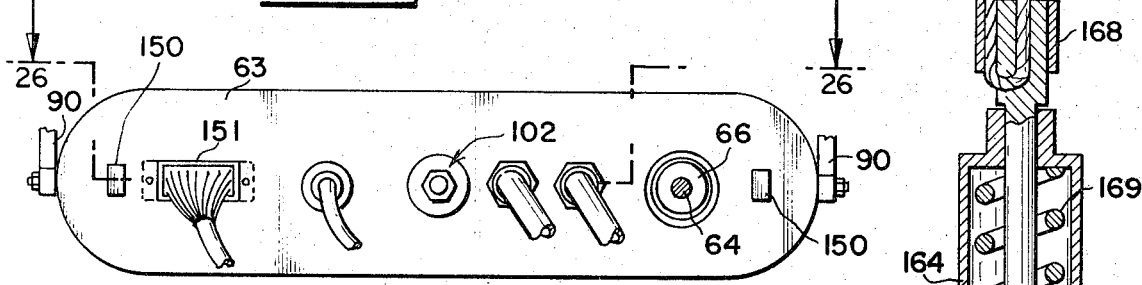
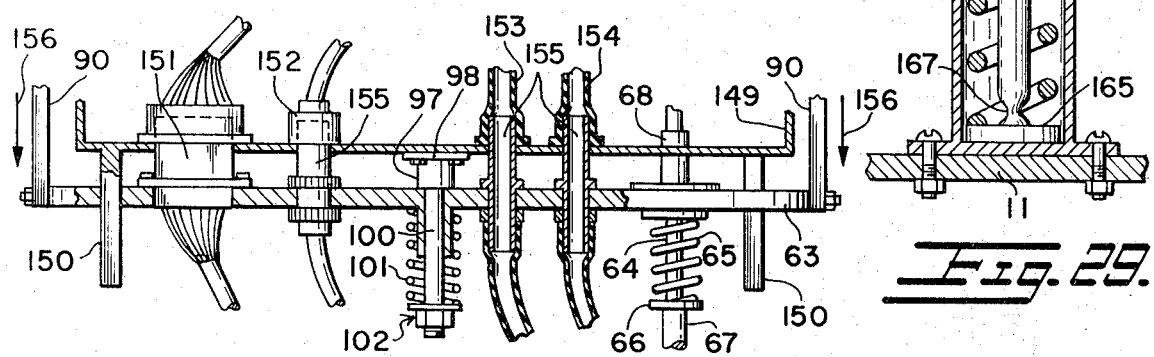
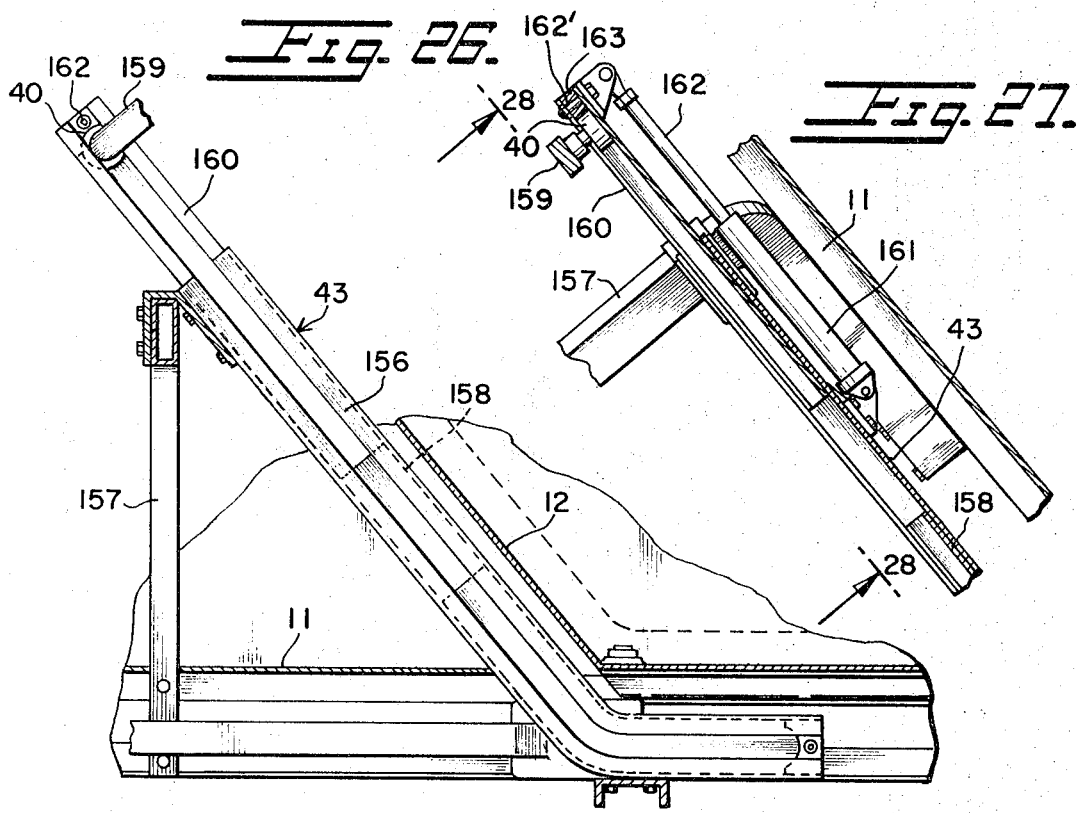

SAFETY VEHICLE

The present invention relates to safety vehicles, and in particular to an improved safety vehicle, especially for automobiles, for preventing injury to passengers during head-on and rear-end collisions.

A safety vehicle, having a movable passenger compartment for protecting the passengers riding therein from injury, is disclosed in the applicant's U.S. Pat. No. 3,695,629. The passenger compartment of the vehicle is moved upwardly at the impact of a collision by kinetic energy generated by the movement of the vehicle. This movement of the compartment maintains the forward momentum of the passengers until safety devices can be brought into operation to restrain the passengers from being hurled forward and colliding with the interior of the passenger compartment. The passenger compartment moves upwardly away from the fuel tank and engine fire areas, and out of the direct line of the collision so that the compartment is not crushed by the collision, thus further increasing the safety of the passengers riding in the vehicle. The operation of such a passenger compartment is totally automatic, and requires no attention of the driver of the vehicle. The safety devices utilized also do not restrict the passengers while they are riding in the vehicle, although the restraining nets of the passenger compartment provide even greater protection than conventional seat belts.

Although this vehicle represents a significant improvement over conventional safety vehicles, it has been discovered that the safety devices can be significantly improved to increase the safety of the passengers and prevent injuries to them. For example, the safety nets of the vehicle disclosed do not sufficiently cushion the passengers during high-speed collisions at which time they are hurled forward at a great speed and with great force, sometimes stretching the safety nets restraining them and colliding with the interior of the passenger compartment. In addition, at the high speeds at which vehicles travel in present times, the response of the mechanical linkages which release the passenger compartment is not sufficiently rapid to release the compartment and activate the safety devices to restrain the passengers before the momentum of the passengers is interrupted by the collision. The present invention obviates these problems, by providing a safety net having an enlarged forward portion which includes air under pressure for cushioning the torso of the passengers during a collision. A mechanical advance mechanism is also provided to increase the speed of response of the safety device activating system relative to the speed of the vehicle. A safety front passenger seat for the protection of both the passengers in the front of the compartment and in the rear of the compartment, is included and comprises a rigid stationary portion attached to the passenger compartment which includes a headrest, and a movable seat and backrest received in the stationary back portion which is adjustable in both vertical and horizontal directions. This safety seat prevents passengers in the rear portion of the vehicle from being thrown against the back of the front seats and crushing the passengers in the front of the compartment between the dashboard and the front seats. Also, in order to increase the speed of the release of the passenger compartment, a detachable instrument panel interface plate is provided for slidably coupling the electrical, hydraulic and vacuum lines of the vehicle to the passenger compartment. In the present invention, the steering column is telescopically constructed and is withdrawn by a cable attached to the compartment release mechanism to collapse the steering column before any other operation occurs to prevent injury to the driver caused by the steering wheel. The safety vehicle disclosed herein essentially improves the applicant's previous safety vehicle by automatically compensating for the speed at which modern vehicles travel, and its effect on the operation of a mechanical linkage.

Accordingly, the present invention generally provides a safety vehicle for passengers, which includes a vehicle body, a passenger compartment movable on the vehicle body, and pivotable safety nets mounted on the ceiling of the passenger compartment for disposal in front of the passengers in the vehicle during a collision. The passenger compartment includes seats and vehicle controls, and is mounted on a pair of elongated, linearly perforated tracks affixed to the vehicle body. At least one pair of sprocket wheels are rotatably mounted at the rearward end of the passenger compartment, and engage the perforated tracks so as to guide the passenger compartment therealong. Roller wheels coupled to the sprocket wheels and engaging the tracks, prevent vertically upward movement of the passenger compartment with respect to the tracks and the vehicle body. A pair of upwardly inclined guide tracks are disposed in the vehicle body in front of the passenger compartment, in which additional roller wheels, which are rotatably mounted on the passenger compartment, are disposed, for guiding the passenger compartment upwardly. Spring-loaded pistons, mounted in cylinders on the vehicle body, are coupled to the passenger compartment at the forward end thereof, and force the end of the compartment upwardly to initiate movement after impact. A detachable instrument panel interface plate, telescopic steering control, and brake pedal are also provided which are detachable from the passenger compartment immediately after a collision so as to enable the passenger compartment to move upwardly. A safety passenger seat is received in a stationary backrest which is rigidly affixed to the passenger compartment support posts. The safety nets have enlarged, air-cushioned forward portions for cushioning the passengers during a collision. In other embodiments of the invention, inflatable air bags are inflated by electrical devices at the impact of a collision, for restraining the passengers separately or in combination with the safety nets. Detachable cable fasteners affixed to the body of the vehicle actuate the safety nets and collapse the telescopic steering system.

It is therefore an object of the present invention to provide a safety vehicle for preventing injury to passengers during head-on and rear-end collisions.

It is also an object of the present invention to provide an improved safety vehicle in which "the second impact", that occuring between the passengers and the interior of the passenger compartment, is prevented.

It is still another object of the present invention to provide an improved safety vehicle in which "the third impact", the collision between the passengers and the interior of the passenger compartment as a result of the rebound of the automobile, is also prevented.

It is still a further object of the present invention to provide an improved safety vehicle which is simple in design, easy to manufacture, and efficient and reliable in operation without causing false alarms during normal driving conditions.

Other objects and features of the present invention will become apparent from the following detailed description when taken in connection with the accompanying drawings which disclose several embodiments of the invention. It is to be understood, however, that the drawings are designed for the purpose of illustration only and are not intended as a definition of the limits and scope of the invention.

In the drawings, wherein similar reference numerals denote similar elements throughout the several views:

FIG. 1 is a partial cross-sectional side view of a safety vehicle constructed in accordance with the present invention;

FIG. 2 is a cross-sectional top view of the safety vehicle, taken along section 2—2 of FIG. 1;

FIG. 3 is a partial front cross-sectional view of the safety nets of the safety vehicle, taken along section 3—3 of FIG. 1;

FIG. 4 is a partial cross-sectional side view of the safety nets taken along section 4—4 of FIG. 3;

FIG. 11 is a cross-sectional side view of the steering column and steering control of the safety vehicle, taken along section 11—11 of FIG. 10;

FIG. 12 is a cross-sectional rear view of the steering column, taken along section 12—12 of FIG. 11;

FIG. 12A is a cross-sectional view of the steering column, taken along section 12A—12A of FIG. 12;

FIG. 13 is a partial, cross-sectional side view of the forward portion of the passenger compartment of the safety vehicle, taken along section 13—13 of FIG. 10;

FIG. 14 is a partial front view of the passenger compartment of the safety vehicle, taken along section 14—14 of FIG. 13;

FIG. 15 is a cross-sectional side view of the movable control plate of the safety vehicle, taken along section 15—15 of FIG. 10;

FIG. 16 is a cross-sectional side view of the operational controls of the passenger compartment of the safety vehicle, taken along section 16—16 of FIG. 10;

FIG. 17 is a partial, cross-sectional side view of the rear portion of the passenger compartment of the safety vehicle, taken along section 17—17 of FIG. 10;

FIG. 18 is a partial cross-sectional side view of the safety vehicle illustrated in FIG. 1, shown in its condition after the impact of a head-on collision;

FIG. 19 is a partial cross-sectional side view of the rear bumper control mechanism of the safety vehicle, taken along section 19—19 of FIG. 10;

FIG. 20 is a partial top cross-sectional view of the front bumper control mechanism of the safety vehicle;

FIG. 21 is a partial cross-sectional side view of another embodiment of a safety vehicle constructed in accordance with the present invention, shown in its condition after the impact of a head-on collision;

FIG. 22 is a partial, cross-sectional front view of the safety vehicle, taken along section 22—22 of FIG. 10;

FIG. 23 is a partial side view of the safety vehicle, taken along section 23—23 of FIG. 22;

FIG. 24 is a partial cross-sectional side view of still another embodiment of a safety vehicle constructed in accordance with the present invention, shown in its condition after the impact of a head-on collision;

FIG. 25 is a rear plan view of the movable control plate of the safety vehicle of the present invention, taken along section 25—25 of FIG. 24;

FIG. 26 is a cross-sectional top view of the control plate, taken along section 26—26 of FIG. 25;

FIG. 27 is a partial top view of the guide rails for the passenger compartment of the safety vehicle, taken along section 27—27 of FIG. 24;

FIG. 28 is a partial side view of the guide rails of the safety vehicle, taken along sections 28—28 of FIG. 27; and FIG. 29 is a cross-sectional side view of the cable clamp fastener of the safety vehicle.

Figures 5, 6:
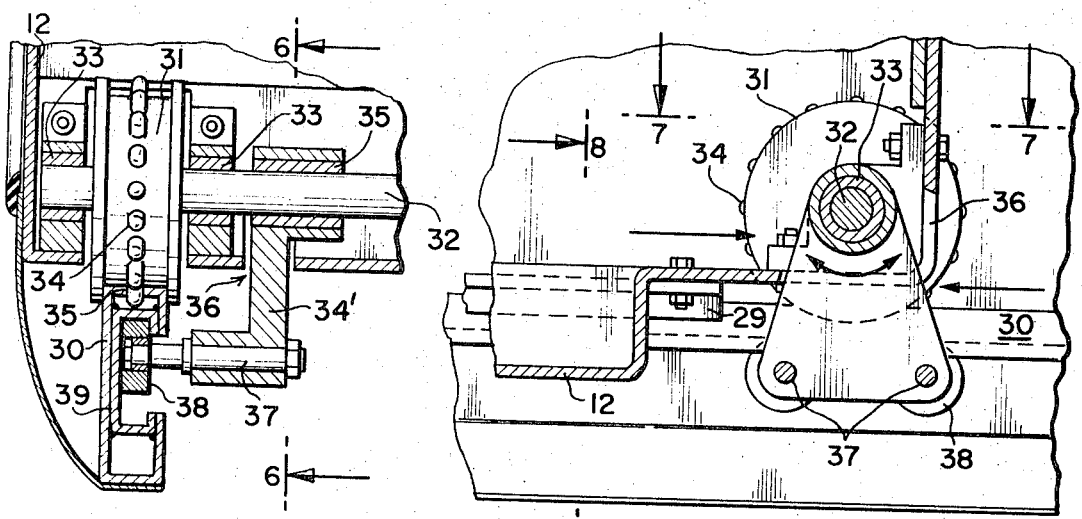
FIG. 5 is a partial cross-sectional front view of the safety vehicle, taken along section 5—5 of FIG. 1, showing the sprocket wheel and mounting member utilized to secure the passenger compartment of the safety vehicle on the guide tracks thereof.
FIG. 6 is a partial, cross-sectional side view of the sprocket wheel and the mouting member, taken along section 6—6 of FIG. 5.

Referring now to the drawings, specifically FIG. 1, there is shown a safety vehicle 10 comprising a vehicle body 11 and a movable passenger compartment 12. A plurality of safety nets 13 are pivotably mounted on the ceiling of passenger compartment 12 at one end, and extend crosswise across the entire width of the passenger compartment. The safety nets are constructed of four-way stretchable latex foam rubber or polyurethane, and are provided with enlarged forward portions 14 which include an air pocket 15 in which air at atmospheric pressure is disposed, similar to a sealed rubber air tube. Resilient plastic stiffening bars 16 are disposed within the enlarged portions of the nets and extend across their entire width. Metal inserts are impregnated in bars 16 to strengthen them. As shown in FIG. 2, each net has a plurality of apertures 17 in the surface thereof for reducing the effective air resistance during the lowering of the nets in the passenger compartment. The forward portions of the stiffening bars are provided with cylindrical passageways 18 which receive guide members 19, each comprised of a vertically disposed cylinder and a perpendicular shank, which are disposed in guide tracks 20 provided in the windshield posts of the safety vehicle. Tracks 20 extend only halfway down the posts of the passenger compartment. At the rearward portions thereof, the nets are provided with cylindrical shafts 21 which have roller bearings 22 affixed to the ends thereof. These roller bearings are disposed in guide tracks 23 mounted on the ceiling of the passenger compartment. On the top surface of each net, a plurality of frictional securement pads 24 are disposed, which frictionally engage a plurality of additional friction pads 25, affixed to the ceiling of the vehicle for the front passenger net of the passenger compartment, and to the lower surface of the front safety net of the passenger compartment for the rear safety net. The friction pads are pressure sensitive and secure both safety nets in their upward positions on the ceiling of the passenger compartment.

A plurality of control cables 26 are affixed to the safety nets by means of coupling members 19. These cables are disposed through a plurality of conduits 27 mounted on each side of vehicle body 11. The cables are anchored at the rear of the passenger compartment on vehicle body 11 by cable clamps 28.

FIGS. 5-9 illustrate in detail how passenger compartment 12 is slidably mounted on vehicle body 11. A apir of elongated, longitudinally-extending guide tracks 29 are affixed to the bottom surface of passenger compartment 12, and are disposed over elongated guide rails 30 rigidly affixed to the vehicle body. Guide tracks 29 comprise a single folded piece of sheet metal. A pair of sprocket wheels 31 are rotatably mounted on passenger compartment 12 on shaft 32 which is disposed in ball bearings 33 rigidly affixed to the passenger compartment. Each of the sprockets 34 thereof extend radially outwardly from sprocket wheels 31 and are received in a plurality of apertures 35 provided in guide rails 30. A pair of downwardly-extending, L-shaped arm 34' are pivotably mounted on ball bearings 35 on shaft 32 in passenger compartment 12 adjacent sprocket wheels 31. Arms 34' extend downwardly through the bottom of passenger compartment 12 through apertures 36 provided therein. The lower ends of arms 34' support a pair of cylindrical shafts 37 on which rotatable wheels 38 are disposed. A second pair of guide rails 39 are disposed in guide rails 30 for receiving rotatable wheels 38. The arms, guide rails and wheels prevent vertical movement of passenger compartment 12 with respect to guide rails 30.

Figure 7:
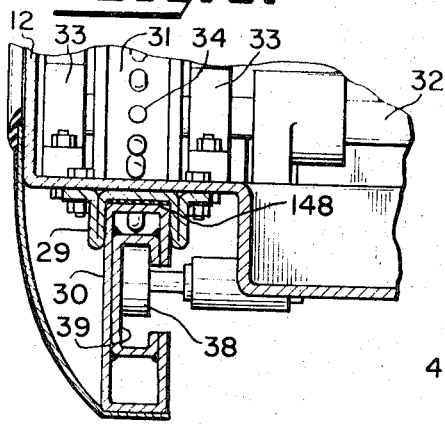
FIG. 7 is a partial cross-sectional top view of the mounting member taken along section 7—7 of FIG. 6.
Figures 8, 9:
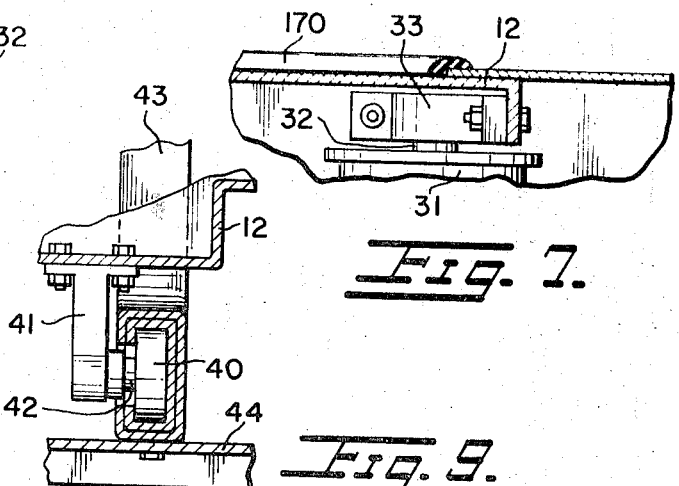
FIG. 8 is a cross-sectional front view of the guide tracks of the safety vehicle, taken along section 8—8 of FIG. 6.
FIG. 9 is a partial rear cross-sectional view of the guide tracks of the safety vehicle, taken along section 9—9 of FIG. 1.

A sealing strip 170 is attached to one side of the vehicle body adjacent compartment 12 as shown in FIG. 7 to seal the gap between the compartment and the body of the vehicle. A pair of rotatable guide wheels 40 are rotatably mounted on passenger compartment 12 at the forward end thereof by means of downwardly-extending, rigid, L-shaped arms 41 having shafts 42 disposed therein. Guide wheels 40 are disposed in a pair of upwardly-extending guide rails 43 which are disposed at an angle of approximately 40° with respect to the frame 44 of the vehicle.

As shown in FIG. 1, front seat 45 of the safety vehicle is movably mounted in passenger compartment 12 and comprises a stationary rear portion 46 which is not movable with respect to the horizontal seat. The stationary portion includes a headrest for receiving the backrest portion of seat 45. Stationary portion 46 is rigidly affixed to the posts of the passenger compartment of the safety vehicle and prevents passengers in the rear of the compartment from hitting the front seats during a collision and crushing the passengers in the front of the compartment between the dashboard and the seats. Seat 45 is movable vertically and horizontally, in the directions indicated by arrows 49 due to the spaced-apart relationship of stationary portion 46 and seat 45. Rear seat 50 is rigidly secured to passenger compartment 12 and is not movable.

Passenger compartment 12 is secured in the vehicle body so that the rear wall 51 thereof is spaced apart from the truck wall 52 of the vehicle. A rubber sealing strip 119 is affixed to the vehicle body and seals the space between it and the compartment. Rigid guide bars 53 are mounted on wall 51 and extend outwardly into and through wall 52 in an aperture provided therein. A rigidly mounted roller assembly 54, which is secured on wall 52, engages the upper portion of bar 53 and prevents vertical movement of passenger compartment 12 in vehicle body 11 without restricting longitudinal movement of the compartment. The passenger compartment is also spaced apart from the vehicle body at its front end and a rubber sealing strip 171 is disposed over the gap therebetween.

Figure 10:
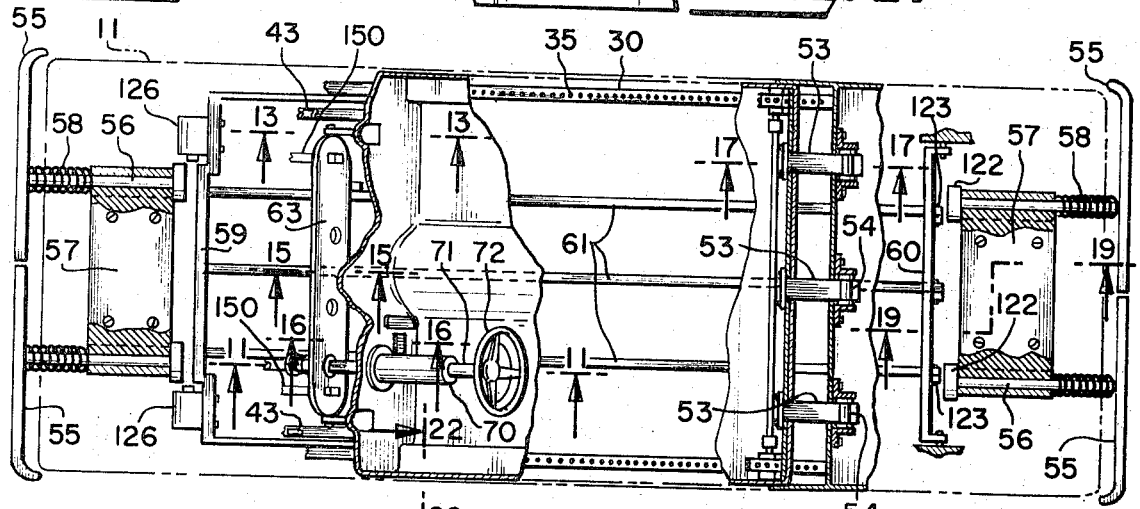
FIG. 10 is a top plan view, partially broken away, of the safety vehicle illustrated in FIG. 1.

FIG. 10 illustrates the interior of the vehicle body, particularly those parts which are coupled to the passenger compartment. At each end of vehicle body 11, a split bumper comprising two bumper members 55 are mounted on the vehicle body by means of plunger rods 56 slidably disposed in mounting bracket 57. Bumper members 55 are spaced apart from vehicle body 11 by a specified distance shown in FIG. 1. Coil springs 58 are disposed on rods 56 between the mounting bracket and the bumper members, and bias the bumper outwardly from the front and rear of the car. The ends of the plunger rods in the vehicle are disposed adjacent a movable bumper bar structure comprising a front bumper bar 59 and a pivotable rear bumper bar 60, which are coupled together by a plurality of longitudinally disposed parallel coupling bars 61 and extend below the passenger compartment in the vehicle body. It should be noted that only one bar is needed, but that a plurality of bars is preferable to provide strength. The bumper bar structure disconnects the vehicle controls in the passenger compartment from the vehicle body upon impact during a head-on or rear-end collision.

The bumper bar structure is illustrated in further detail in FIGS. 11, 12 and 12a. One of bars 61 has one end of a lever arm 62, which is pivotably secured on vehicle body 11, pivotably secured thereon so that the linear movement of bars 61 is translated to rotational movement of the lever arm. The arm engages the upper surface of a slidable plate 63 which is disposed over the vehicle steering rod 64, which has a rectangular cross-sectional shape. A coil spring 65 is disposed between an abutment flange 66 provided on the steering rod casing 67 and plate 63. A rectangular coupling member 68 is slidably disposed over rod 64 and through an aperture provided in plate 63. Ball bearings 69 are disposed in plate 63 around coupling member 68.

A telescopic steering column, consisting of a first stationary cylinder 70 rigidly affixed to compartment 12, and a second cylinder 71 disposed and slidable within first stationary cylinder 70, is provided. Steering wheel 72 is mounted on a hollow rectangular-shaped steering rod 73 mounted on ball bearings 74 disposed on the inside surface of cylinder 71. A steering column coupling rod 75 is disposed in coupling member 68 at one end and in rod 73 at its other end. The coupling rod is mounted on ball bearings 76 at the lower end of cylinder 70 and is slidable within rod 73 so that cylinder 71 is slidable downwardly into stationary cylinder 70.

A pivotable, L-shaped latch 77 is pivotably mounted within cylinder 71 and extends through aligned apertures provided in cylinders 70 and 71 and prevents slidable movement of the cylinders with respect to each other. A cable 78 disposed on rotatable rollers 79 mounted on the passenger compartment, is coupled to the pivotable latch. Cable 78 is secured to one of bars 61 of the vehicle by means of a cable clamp 79'. The clamp has a predetermined strength and breaks under a corresponding stress force when the passenger compartment is moved by the impact of a crash. Cable 78 pivots latch 77 upwardly out of the aperture provided in cylinders 70 and 71 immediately upon impact during a collision, and pulls cylinder 71 into cylinder 70. A resilient release button 80, which is mounted on stationary cylinder 70 by a flexible strip of metallic material, pushes latch 77 out of the apertures in the cylinders when it is pressed inwardly from the outside of the steering column. When the latch is pushed from the apertures, cylinder 71 slides into cylinder 70, as shown by the dotted lines in FIG. 11.

FIGS. 13 and 14 illustrate in detail the springbiased piston cylinders which are used to lift the front of passenger compartment 12 upwardly immediately after the initial impact of a collision. Each cylinder 81 is mounted on vehicle body 11 and has a coil spring 82 disposed therein between its bottom surface and the lower surface of a piston 83 which is slidably disposed therein. Piston 83 is coupled to a piston rod 84 which extends longitudinally through spring 82 outwardly through an aperture in the bottom surface of cylinder 81. A bolt 85 is threadably disposed on the end of rod 84 to limit its upward movement within cylinder 81. An abutment member 86 is slidably disposed within cylinder 81, and includes a radially outwardly-extending aperture 87 and an upwardly-extending threaded rod 88. Each of cylinders 81 also includes an aperture which is aligned with aperture 87, in which a planar locking member 89 is disposed. The locking member is pivotably coupled by a lever arm coupling structure 90 to plate 63. Abutment members 86 are separated from passenger compartment 12 by covers 91 which include apertures through which rods 88 extend. A bolt and lock washer combination 92 secure each of the abutment members 86 on passenger compartment 12.

Cylinders 81 are rigidly mounted on pivotable mounting brackets 93 secured on vehicle body 11 by stationary brackets 94 and bolts 95. Each of coil springs 96 is coupled at one end to bracket 94 and at the other end to bracket 93, and biases cylinder 81 outwardly away from passenger compartment 12.

FIG. 15 illustrates the manner in which plate 63 is mounted on vehicle body 11. An elongated cylindrical bolt having an enlarged first portion 97, is rigidly affixed by a flange 98 to the fire wall 99 of the safety vehicle, and has a second portion 100 having a diameter less than that of the first portion. Plate 63 is slidably disposed over portion 100 of the bolt, between a coil spring 101 and enlarged portion 97 of the bolt. The lower end of portion 100 is threaded with a washer and nut combination 102 which secures spring 101 on the bolt.

FIG. 16 illustrates the coupling of the operational control disposed in the passenger compartment to the control mechanisms in the safety vehicle body 11. Brake pedal 103 is pivotably mounted at one end on floorboard 104 and engages a rod 105 disposed through floorboard 104 and biased inwardly into the compartment by a coil spring 106 disposed around rod 105. The rod has flat abutment members disposed at each end thereof. Another rod 107 is slidably disposed in the vehicle body adjacent the end of rod 105 and is integrally formed with a third rod 108 also slidably disposed in the vehicle body. Flat abutment members are attached to the ends of rods 107 and 108. A coil spring 109 is disposed around rod 108 and biases rods 108 and 107 outwardly towards passenger compartment 12. Rod 107 extends thorugh an aperture 110 provided in a pivotable arm 111 which is mounted at one end on the vehicle body. The abutment member on the end of rod 108 engages arm 111 and pushes it outwardly towards the passenger compartment. Another lever arm 112 is pivotably mounted at one end in the vehicle body and is spring biased into engagement with arm 111 by a coil spring 113. Arm 112 is disposed through aperture 121 in plate 63. A plurality of saw-tooth-shaped recesses 114 disposed on one surface of arm 112 receive the unsecured pointed end of arm 111. The gas pedal of the vehicle is linked to the passenger compartment only by those structural elements within the dotted circle in FIG. 16.

FIG. 17 illustrates retaining bars 53 in detail. The three bars 53 are rigidly attached to vehicle passenger compartment 12, and extend into gap space 115 provided between the trunk wall 52 and passenger compartment 12. Aperture 116 in truck wall 52 receives members 53, which engage a rotatable wheel 117 mounted on a shaft between a pair of mounting brackets 118 at each end of aperture 116. Rubber sealing strip 119 is affixed to vehicle body 11 in order to seal the gap between the passenger compartment and the vehicle body.

The operation of the embodiment of the invention just described will now be discussed with reference to FIG. 18:

When the safety vehicle collides head-on with a stationary or moving object, illustrated in FIG. 18 as brick wall 120, front spring bumper members 55 displace plunger rods 56 inwardly so that they engage bumper bar 59 and move bars 61 longitudinally towards the rear of the vehicle. The movement of bars 61 pivots lever arm 62 forward, in the direction shown in FIG. 12, so that the end of the lever arm engages movable plate 63 and forces it downwardly towards the front of the car, as shown in FIG. 12. The movement of plate 63 immediately pulls steering coupling member 68 downwardly so that steering rod 75 is released therefrom, and coupling member 68 is retracted into the vehicle body out of passenger compartment 12. Steering wheel 72 is thus uncoupled from the steering mechanism. As soon as bars 61 move, cable 78 is urged towards the rear of the vehicle and latch 77 is pivoted out of the apertures in cylinders 70 and 71. Cylinder 71 is then pulled down into cylinder 70 by cable 78. The steering column is collapsed before anything else happens. Simultaneously, plate 63 pivots lever arms 90 outwardly away from passenger compartment 12, as shown in FIG. 13, so as to retract locking members 89 from apertures 87 in abutment members 86. Passenger compartment 12 is then released and is movable with respect to the vehicle body. Coil springs 82 then force piston plungers 83 upwardly against abutment members 86 so as to lift the forward position of passenger compartment 12 in guide rails 43. As soon as abutment members 86 are ejected from cylinders 81, coil springs 96 pivot brackets 93 outwardly away from passenger compartment 12 to the position illustrated in FIG. 18. Also simultaneously, plate 63 engages lever arm 117 and applies the brake mechanism of the vehicle. Lever arm 111 is force downwardly in sawtooth recesses 114 so that it cannot move back to its original position, and the brake is applied constantly, after brake pedal 103 is released. The mechanism operates even if the operator of the vehicle did not depress the brake pedal. Thus, before any movement of passenger compartment 12 caused by the forward momentum of the vehicle the steering column is collapsed, the steering mechanism is detached from the vehicle, the passenger compartment is released, and the brake lever is applied.

As soon as the passenger compartment is released, it moves upwardly in guide rails 43 and 30 into the position illustrated in FIG. 18, as a result of the forward momentum of the vehicle. As soon as the forward motion of the compartment takes up all the slack in cable 78, the compartment exerts sufficient force to break cable clamp 79 and permit unrestricted movement of the compartment.

At the same time, cables 26 pull safety nets 13 downwardly in tracks 20 in front of the passengers in passenger compartment 12 to the positions illustrated in FIG. 18. When the nets reach the end of tracks 20 they extend across the upper half of the compartment in front of the passengers in the vehicle. When the passengers are thrown forward, the enlarged portions of the nets become wedged between the passengers and the seat or dashboard of the compartment. The passengers move horizontally as a result of the forward momentum of the vehicle, and the resulting horizontal force exerted on the nets prevents the ends from riding up in tracks 20. The nets thus restrain the passengers to prevent a collision between them and the interior of the passenger compartment. As soon as the passenger compartment completes its upward movement and the vehicle comes to rest, the passengers are no longer forced against the nets, and they can move freely. Clamps 79 and 28 have predetermined material strengths and break away from their attachment points to the vehicle body before passenger compartment 12 reaches its fully extended position shown in FIG. 18. The fluid motion of the passengers in the passenger compartment is maintained by the movement of the compartment until the steering column is collapsed and the nets are set in front of the passengers. The widened forward portion of the nets cushion the chest and lower torso of the passengers to prevent injury thereto.

If there is a rear-end collision, rear bumper members 55 push slidable rods 56 inwardly so that their ends 122 engage levers 123 on rear bumper bar 60 and move bars 61 rearwardly. The passenger compartment controls are detached, and the steering column collapsed, as described previously. The nets, however, are not drawn downwardly, since there is no forward movement of the passenger compartment. When locking members 89 are withdrawn from abutment member 86 by plate 63, spring 82 forces the front of passenger compartment 12 upwardly until the abutment member clears cylinder 81. Spring 96 then pivots cylinder 81 outwardly, as shown in FIG. 18, so that it clears the end of passenger compartment 12 and does not obstruct its rearward movement. The forward movement of the safety vehicle caused by the impact of the collision moves the vehicle body 11 forward with respect to compartment 12 which is free to move on guide tracks 30. There is, thus, an effective rearward movement of the passenger compartment in space 115 to absorb the impact of the collision. The rearward movement of the compartment is guided by retaining bars 53. This movement of the passenger compartment in response to the impact of a rear-end collision prevents whiplash injury to the passengers riding in the vehicle.

FIGS. 19–21 illustrate another embodiment of a safety vehicle constructed in accordance with the present invention. In this embodiment of the invention, rear split bumper members 55 cause rods 56 to force abutment plunger 122 against lever arm 123 which is pivotably mounted on the vehicle body. This structure is the same as the rear bumper structure illustrated in FIG. 10. Rods 61 are pivotably coupled to lever arm 123, and pivot arm 62 against a switch 124 mounted in plate 63. The switch is coupled to an inflation mechanism for inflating inflatable air bags 125 mounted in the passenger compartment.

FIG. 20 shows solenoid switch 126 which is mounted on front bumper bar 59 as shown in FIG. 10. The solenoid switch has a retractable cylindrical rod 27 which moves between rod 26 and bumper bar 59 in the direction of arrow 128. The cylindrical rod is inserted therebetween by a speed-monitoring advance mechanism when the vehicle reaches a predetermined speed in order to compensate for the time it takes rod 56 to engage bumper bar 59 after a collision occurs at high speed. The faster the speed at which the vehicle is moving the sooner that the passenger compartment must be released to avoid injury to the persons riding therein, since they also move at the higher rate of speed. The reduction of the distance between rod 26 and bumper bar 59, therefore, advances the time at which the passenger compartment 12 becomes detached from the vehicle body and moves upwardly into its position shown in FIG. 21 after collision.

The operation of this embodiment of the invention is essentially the same as that previously described, and the only difference between it and the embodiment illustrated in FIGS. 1–18 is that the safety nets and related cable apparatus have been replaced by inflatable air bags 125, and that switching mechanism 124 which operates to inflate the air bags has been added. In addition, rear window 131 is mounted in a resilient mounting frame so that it pops out under the pressure exerted by the air displaced when the air bags are inflated.

The operation of this embodiment of the invention is as follows:

When the vehicle strikes a stationary or moving object, front split bumpers 55 push rods 56 inwardly so that they engage bumper bar 59 (either directly or through cylindrical rod 127, depending on the speed of the vehicle as previously described), and move rods 61 longitudinally on their mounting members 172 so as to pivot lever arm 62 and thereby activate switch 64. Plate 63 is moved in the direction of arrow 129 and detaches the operational and steering controls of the vehicle in the same manner as in the previously described embodiments. Switch 124 activates a suitable inflation mechanism, such as bottled gases, or compressed air cylinder, to inflate air bags 125, which are mounted behind the dashboard 130 of the passenger compartment and in stationary portion 46 of seat 45. In this embodiment of the invention, switch 124 is activated, and the air bags are inflated, before plate 63 is moved by lever arm 62 and the operational controls are detached from the vehicle body, and before passenger compartment 12 begins its initial upward movement in guide rails 43 as a result of the forward momentum of the collision. This insures that the forward momentum of the passengers is maintained until the air bags are set in front of the passengers. Rear window 131 is ejected from window frame 132 by the displaced air in the passenger compartment when the bags are inflated. If the vehicle is struck from the rear, the operation of the air bags is the same, except that compartment 12 moves rearwardly as in the previously described embodiment.

FIGS. 22–24 illustrate still another embodiment of a safety vehicle constructed in accordance with the present invention.

In this embodiment, passenger compartment 12 is secured on the vehicle body by retractable, spring-biased cylindrical rods 133 slidably disposed in cylinders 134 formed in guide rails 30. Rod 133 comprises a first portion 134 which extends upwardly into a circular receiving cylinder 135 provided in passenger compartment 12, a wider central portion 136 affixed thereto which has an outwardly extending shaft 137 mounted thereon which supports a rotatable roller 138, and a lower cylindrical rod 139 having a smaller diameter than the other two portions about which a coil spring 140 is slidably disposed. Roller 138 is disposed in a curved slot 141 provided in a movable plate 142 attached to mounting arms 143 shown in FIG. 23. Mounting arms 143 are coupled to longitudinal bars 61 of the vehicle and move in unison therewith. Guide members 144 are mounted on the vehicle body and guide plate 142 in a longitudinal direction with respect to roller 138.

In this embodiment of the invention, inflatable air bags 145 are fastened to the ends of safety nets 13 and replace the enlarged portions of the nets described in the embodiment of FIG. 1. Slidable T-shaped fastening members 146 are attached to the air bags and have suitable recesses for receiving the bags in their folded condition. The bags are coupled to a suitable inflation mechanism, such as compressed air. The T-shaped support members are disposed entirely across the width of the passenger compartment, and are attached to the ceiling thereof in the same manner as the nets of FIG. 1. Rollers are provided at the ends of the support members and are disposed in tracks 20 in the windshield posts of the vehicle for slidably guiding the nets and inflatable bags downwardly in response to the pull of cables 26. Pivotable switches 147 are mounted on the windshield posts adjacent tracks 20 and engage T-shaped support members 146 as the members slide downwardly in the tracks so as to activate devices and inflate air bags 145. Rear window 131 is mounted in the same type of resilient frame described in the previous embodiment.

The operation of this embodiment of the invention is as follows:

When split bumpers 55 in front of the vehicle engage a stationary or moving object, front bumper bar 59 is moved rearwardly by rods 56. Mounting members 143 then slidably move plates 142 rearwardly causing roller 138 to roll downwardly in slot 141 and retract cylinder portion 134 of rod 133 from cylinder 135 in passenger compartment 12. Passenger compartment 12 is then free to slide on guide rails 30 and 43 to its upwardly extended position shown in FIG. 24. Simultaneously, the steering column is collapsed by the force exerted by cables 78, as described with respect to the embodiment of FIG. 1, while cables 26 draw the T-shaped support members downwardly in tracks 20 in the passenger compartment so that switches 147 are engaged and bags 145 are inflated. Rear window 131 is ejected from the rear of the vehicle by the air displaced by the inflated bags. The operation of this embodiment of the invention is otherwise substantially the same as that described with respect to FIG. 1.

In all of the previously described embodiments of the invention, the top surface of guide rails 30 is coated with a layer of teflon 148 which reduces the frictional forces created by the sliding engagement of the bottom surface of passenger compartment 12 and the top surface of guide rails 30 on which the passenger compartment is supported during normal riding conditions.

FIGS. 25 and 26 illustrate the moving plate 63 described with respect to the above-discussed embodiments of the invention. A rigid plate 149 attached to the vehicle body is an interface between the controls of the passenger compartment and the vehicle body. Guide members 150 are attached to plate 149 and extend through apertures provided in plate 63 for guiding the plate longitudinally as it is moved by lever arm 62. The electrical wires of the safety vehicle are coupled to the passenger compartment by an electrical connector 151, and the vacuum and hydraulic hoses are coupled to the passenger compartment by couplings 152, 153 and 154, which comprise slidable hoses disposed over the ends of rigid couplings 155 affixed to plate 63. The electrical connector, and the vacuum and hydraulic hose couplings are affixed at their ends to plate 63, and are disposed through apertures in plate 149. Thus, when plate 63 is moved in the direction of arrows 156 by lever arm 62, connector 151 and couplings 155 are moved away from plate 149, and are withdrawn from their corresponding connecting members which lead to the passenger compartment.

FIGS. 27 and 28 illustrate guide rails 43 of the embodiments previously discussed. Guide rails 43 comprise a first stationary rail section 156 which is rigidly affixed to vehicle body 11 by a vertically disposed support structure 157, which extends across the width of the safety vehicle. A stationary guide rail 158 having dimensions smaller than rail section 156 is disposed within section 156 and receives roller wheel 40, which is mounted on a mounting arm 159 affixed to passenger compartment 12. A slidable rail section 160 is disposed in stationary section 156, and is slidable upwardly out of section 156 as shown in FIG. 28. A hydraulic cylinder 161 has the piston arm 162 thereof affixed to the end of rail section 160 so that it limits the movement thereof out of section 156. The bottom of cylinder 161 is affixed to guide rail 43 on the outside surface thereof. A bolt 162' is disposed through the end of rail section 160, and secures an abutment member 163 therein for preventing roller 40 from sliding out of rail section 160.

When passenger compartment 12 begins its upward movement, rail section 160 is disposed entirely within section 156, and it forms a continuous rail passageway with section 158. Roller 40 slides upwardly from section 158 into section 160 until it abuts abutment member 162, whereupon the passenger compartment lifts portion 160 out of rail 156 as illustrated in FIG. 28. Piston 161 stops the upward movement of rail section 160, and the upward movement of the passenger compartment, when piston rod 162 is fully extended.

FIG. 29 illustrates the cable clamps described in the embodiments of the invention. The clamp consists of a cylinder 164, fastened to vehicle body 11, in which a slidable piston 165 is disposed. The piston is coupled to a piston rod 166 by a narrow converging stem 167 having a predetermined strength which breaks under a corresponding stress force exerted on the clamp. The cables are coupled to shaft 166 by a crimped fastener 168 on the end of shaft 166, and spring 169 forces piston 165 against the bottom of cylinder 164. When force is exerted on shaft 166 by the cable, piston 165 is withdrawn upwardly into cylinder 164 until the piston engages the top of the cylinder. At this point, stem 167 breaks, and shaft 166 slides from cylinder 164, thus releasing cable 167 from the vehicle body.

While only several embodiments of the present invention have been shown and described, it will be obvious to those persons skilled in the art that many changes and modifications may be made thereunto without departing from the spirit and scope of the invention.

What is claimed is:

1. A safety vehicle for passengers comprising:
a vehicle body;
a passenger compartment including seats and vehicle controls disposed in said vehicle body;
a pair of elongated longitudinal guide tracks mounted on said vehicle body;
means mounted on said passenger compartment for engaging said tracks and guiding said passenger compartment therealong and limiting lateral movement of said passenger compartment with respect to said tracks;
means coupled to said means for engaging said tracks for limiting vertical movement of said passenger compartment with respect to said tracks;
a pair of upwardly inclined guide tracks, disposed in the vehicle body in front of said passenger compartment;
means mounted on said passenger compartment and disposed in said upwardly inclined guide tracks for guiding said compartment therein;
detachable securing means mounted on said vehicle body and coupled to said passenger compartment for releasing said passenger compartment in response to the impact of a collision with said vehicle body so that said passenger compartment is movable in said upwardly inclined and longitudinal guide tracks with respect to said vehicle body, said securing means comprising front and rear movable bumpers slidably mounted on said vehicle body, at least one longitudinally extending slidable bar coupled to said bumpers and responsive to movement thereof, a pivotable lever arm pivotably secured on said vehicle body and coupled to said longitudinally extending bar, a slidable plate member mounted on said vehicle body adjacent said lever arm, said lever arm being pivoted into engagement with and slidably displacing said plate in response to movement of said longitudinal bar, releasable locking means, mounted on said vehicle body, and coupled to the forward end of said passenger compartment for detachably securing the forward end of said passenger compartment to said vehicle body, means affixed to the rearward end of said compartment for limiting vertical movement of the passenger compartment with respect to said tracks; and
means mounted on said upwardly inclined guide tracks for limiting the movement of said compartment therein.

2. The safety vehicle as recited in claim 1, wherein said releasable locking means comprises a cylinder mounted on said vehicle body, a plunger slidably disposed within said cylinder, a slidable abutment member disposed in said cylinder and engaging said plunger, and coupled to said passenger compartment, a spring disposed in said cylinder between one surface thereof and said plunger, and releasable retaining means for securing said abutment member in said cylinder.

3. The safety vehicle as recited in claim 2, wherein said abutment member includes a recess in one surface thereof, and said cylinder includes an aperture aligned with said recess, and wherein said releasable retaining means comprises a rigid planar locking member, slidably disposed through said aperture into said recess for locking said abutment member in said recess.

4. The safety vehicle as recited in claim 2, wherein said means for limiting vertical movement of said passenger compartment comprises at least one rotatable roller, mounted on said vehicle body behind said passenger compartment, and at least one rigid elongated member, mounted on and extending outwardly from the rear portion of said passenger compartment, for engaging said rotatable roller and limiting vertical movement of the rearward end of said passenger compartment with respect to said vehicle body, said elongated member being movable longitudinally with respect to said vehicle body against said rotatable roller.

5. The safety vehicle as recited in claim 1, wherein said means for limiting the vertically upward movement of said passenger compartment with respect to said tracks comprises, an L-shaped, downwardly-extending arm, pivotably mounted on said passenger compartment, having a roller wheel mounted on one end thereof for engaging said tracks and thereby limiting vertical movement of said compartment.

6. The safety vehicle as recited in claim 1, wherein said passenger compartment further comprises a front passenger seat having a first stationary backrest, rigidly affixed to said passenger compartment and including an aperture in its upper portion, and a second backrest mounted in said passenger compartment, said second backrest having the upper end thereof disposed in said aperture in said first backrest so as to be movable vertically and horizontally with respect thereto.

7. The safety vehicle as recited in claim 1, wherein said passenger compartment further comprises a telescopic steering column including a first stationary cylinder mounted in said passenger compartment, a second slidable cylinder disposed in said first cylinder, said first and second cylinders including aligned apertures disposed therethrough, and a pivotable latch, coupled by a cable to said means for detachably securing said passenger compartment on said vehicle body, disposed through said apertures for securing said second movable cylinder in said first cylinder and releasing said second cylinder in response to the impact of a collision and withdrawing said second cylinder downwardly into said first cylinder.

8. The safety vehicle as recited in claim 7, wherein said cable further comprises a clamp comprising a cylinder attached to said vehicle body, a slidable piston disposed in said cylinder, a shaft disposed within said cylinder and coupled to said piston by a stem portion having a diameter less than said shaft, said shaft extending from one end of said cylinder and having the end thereof coupled to said cable, and a coil spring, disposed in said cylinder between one end thereof and said piston.

9. The safety vehicle as recited in claim 7, further comprising a first stationary steering rod, coupled to the steering linkage of the safety vehicle, a slidable sleeve, disposed over said stationary steering rod, extending into said stationary cylinder in said passenger compartment, and coupled to said means for detachably securing said passenger compartment on said vehicle body, a second stationary steering rod, mounted in said stationary cylinder, and disposed at one end in said sleeve, and a hollow coupling rod, mounted in said second slidable cylinder, and attached at one end to the steering wheel of said passenger compartment and disposed at the other end thereof over the end of said second stationary steering rod, said hollow coupling rod being slidable downwardly over said second stationary steering rod when said second cylinder is withdrawn into said first stationary cylinder.

10. The safety vehicle as recited in claim 1, further comprising a brake pedal pivotably mounted in said passenger compartment, a first shaft, slidably mounted in said passenger compartment, and having abutment members at each end thereof, for engaging said brake pedal, a first pivotable arm, secured at one end to said vehicle body, and coupled to said means for detachably securing said compartment on said vehicle body, a second pivotable arm, secured at one end to said vehicle body adjacent said first arm, and including a spring for biasing said second arm into engagement with said first arm and a plurality of saw-tooth-shaped recesses disposed longitudinally along the length of said second arm for receiving the end of said first arm, a second shaft slidably mounted in said vehicle body, disposed through said first arm and including a first abutment member disposed at the end thereof for engaging said first shaft in said passenger compartment, and a second abutment member disposed between the ends of said second shaft for engaging said first arm, and a spring, disposed between said vehicle body and said second abutment member for biasing said second abutment member into engagement with said first arm.

11. The safety vehicle as recited in claim 1, further comprising at least one safety net, comprising a sheet of flexible material, extending across the width of said passenger compartment, and pivotably mounted at one end on the ceiling of said passenger compartment, and having an enlarged forward portion in which air under pressure is disposed, the ends of said enlarged forward portion being slidably disposed in vertical guide tracks in said passenger compartment, and further comprising a cable, attached to the ends of said enlarged forward portion, and to said vehicle body, for drawing said nets downwardly over and in front of the passengers in said passenger compartment in response to the impact of a collision.

12. The safety vehicle as recited in claim 11, wherein said safety net further comprises a resilient, elongated member, disposed in said enlarged forward portion of said net, for reinforcing said enlarged portion of said net.

13. The safety vehicle as recited in claim 12, wherein said cable is attached to said vehicle body by a clamp, comprising a cylinder affixed to said vehicle body, a piston slidably disposed in said cylinder, a shaft, coupled to said piston by a stem portion having a diameter less than said shaft, and to said cable at the other end thereof, and a coil spring, disposed in said cylinder about said shaft between one end of said cylinder and said piston.

14. The safety vehicle as recited in claim 1, further comprising at least one safety net, pivotably mounted at one end on the ceiling of the passenger compartment, guide tracks disposed in said compartment, a rigid mounting member, coupled to the end of said safety net and disposed in said guide tracks, and an inflatable air bag, mounted in said mounting member and attached to the end of said safety net, and further comprising a cable, coupled at one end to said vehicle body and at the other end to said mounting member, for drawing said nets, air bags and members downwardly in front of passengers in said passenger compartment.

15. The safety vehicle as recited in claim 1, wherein said means for detachably securing said passenger compartment on said vehicle body includes a first vertically disposed cylinder mounted on said vehicle body having an opening at one end and on one side thereof, a cylindrical rod, disposed in said cylinder through said opening in the end thereof, and including an outwardly extending shank disposed through said opening in the side of said cylinder, and having a roller mounted thereon, a second cylinder, mounted on said passenger compartment, and disposed above said first cylinder on said vehicle body, for receiving said cylindrical rod, a coil spring disposed in said first cylinder on said vehicle body and coupled to said rod for biasing said rod into said second cylinder mounted on said passenger compartment, and at least one slidable plate, having a curved slot for receiving said roller, disposed adjacent said cylinder on said vehicle body and movable longitudinally with respect thereto, responsive to the impact of a collision, linear movement of said plate causing movement of said roller in said slot and said cylindrical rod in said first cylinder on said vehicle body, thereby withdrawing said cylindrical rod from said second cylinder mounted on said passenger compartment.

16. The safety vehicle as recited in claim 1, further comprising a solenoid, mounted on said longitudinal bar, and including a movable shaft for disposal between said bumpers and said longitudinal bar, and means, coupled to said solenoid, and responsive to the speed of the safety vehicle for activating said solenoid and disposing said rod between said bumpers and said bars when the safety vehicle reaches a predetermined speed.

17. The safety vehicle as recited in claim 1, further comprising inflatable air bags, disposed in said passenger compartment, means for inflating said air bags, and a switch, mounted on said plate member adjacent the end of said lever arm, and coupled to said means for inflating said air bags, for engaging said lever arm and activating said means for inflating said air bags.

18. The safety vehicle as recited in claim 1, wherein said plate member includes a plurality of electrical, hydraulic and vacuum couplings rigidly affixed thereto, coupled to said vehicle body, and wherein the vehicle body further comprises a rigid plate, having a plurality of apertures disposed therein, disposed adjacent said slidable plate member, said couplings on said slidable plate member extending through said apertures in said rigid plate, and further comprising a plurality of electrical, hydraulic and vacuum coupling lines, slidably disposed over said couplings extending through said apertures in said rigid plate.

19. The safety vehicle as recited in claim 18, wherein said slidable plate member includes a plurality of apertures disposed at the ends thereof, and wherein said rigid plate further comprises a plurality of elongated guide members, for guiding the movement of said slidable plate member.

20. The safety vehicle as recited in claim 1, wherein said upwardly inclined guide tracks comprise a stationary track housing, a stationary guide track disposed in said housing, and a slidable guide track disposed in said housing adjacent said stationary track, and wherein said means for limiting the movement of said compartment in said upwardly inclined guide tracks comprises a hydraulic cylinder, mounted at one end on said track housing and at the other end on said slidable track with respect to said housing and said stationary track, and an abutment member, secured at one end of said slidable track, for engaging said means disposed in said upwardly inclined guide tracks and limiting the movement thereof in said slidable track.

21. The safety vehicle as recited in claim 1, wherein said longitudinal guide tracks comprise linearly perforated tracks, wherein said means for engaging said longitudinal tracks comprises at least one pair of sprocket wheels rotatably mounted at the rearward end of said passenger compartment, and wherein said means for guiding said compartment in said upwardly inclined guide tracks comprises guide wheels, rotatably mounted on said passenger compartment.

* * * * *